US012687736B2

(12) United States Patent
Keicho et al.

(10) Patent No.: US 12,687,736 B2
(45) Date of Patent: Jul. 21, 2026

(54) DISPLAY DEVICE

(71) Applicant: Shanghai Tianma Micro-Electronics Co., Ltd., Shanghai (CN)

(72) Inventors: Yukie Keicho, Kawasaki (JP); Tetsushi Sato, Kawasaki (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 593 days.

(21) Appl. No.: 17/966,241

(22) Filed: Oct. 14, 2022

(65) Prior Publication Data

US 2023/0128667 A1    Apr. 27, 2023

(30) Foreign Application Priority Data

Oct. 21, 2021    (JP) ................................. 2021-172132

(51) Int. Cl.
*G02B 30/28*        (2020.01)
(52) U.S. Cl.
CPC .................................... *G02B 30/28* (2020.01)
(58) Field of Classification Search
CPC ........ G02B 30/20; G02B 30/22; G02B 30/26; G02B 30/27; G02B 30/28; G02B 30/29
See application file for complete search history.

(56) References Cited

U.S. PATENT DOCUMENTS 5,838,494 A * 11/1998 Araki ...................... G02B 30/27
                                            348/E13.058

6,069,650 A * 5/2000 Battersby .................. G02F 1/29
                                            348/E13.043
6,462,871 B1 * 10/2002 Morishima ............ H04N 13/31
                                            348/E13.043

(Continued)

FOREIGN PATENT DOCUMENTS

| CN | 100591141 C | 2/2010 |
|---|---|---|
| CN | 104035203 A | 9/2014 |
| JP | 2008015395 A * | 1/2008 |
| JP | 5694556 B2 | 4/2015 |

(Continued)

OTHER PUBLICATIONS

Hirotsugu Yamamoto et al., Reduction of the Thickness of Lenticular Stereoscopic Display using Full Color LED Panel, 4660 Proceedings of SPIE 236-245 (2002). (Year: 2002).*

(Continued)

*Primary Examiner* — Jennifer D. Carruth
(74) *Attorney, Agent, or Firm* — Sughrue Mion, PLLC

(57)        ABSTRACT

A display device includes an image display, a first lens element, and a second lens element. The image display includes a plurality of pixels, and displays parallax images corresponding to each of N1 viewpoints (where N1 is an integer of 2 or greater) along a predetermined direction and parallax images corresponding to each of N2 viewpoints (where N2 is an integer greater than N1) along the predetermined direction. When the parallax images corresponding to each of the N1 viewpoints are displayed on the image display, the first lens element divides light emitted from the plurality of pixels among the N1 viewpoints. When the parallax images corresponding to each of the N2 viewpoints are displayed on the image display 10, the second lens element divides light emitted from the plurality of pixels among each of the N2 viewpoints.

4 Claims, 12 Drawing Sheets

(56)    References Cited

U.S. PATENT DOCUMENTS

| | | | | |
|---|---|---|---|---|
| 7,580,186 | B2 * | 8/2009 | Mather | H04N 13/305 |
| | | | | 359/464 |
| 7,760,430 | B2 * | 7/2010 | Shestak | G02B 30/27 |
| | | | | 359/465 |
| 9,588,350 | B2 | 3/2017 | Takagi et al. | |
| 2006/0152812 | A1 | 7/2006 | Woodgate et al. | |
| 2008/0316380 | A1 * | 12/2008 | Ijzerman | H04N 13/359 |
| | | | | 348/E13.059 |
| 2014/0152926 | A1 * | 6/2014 | Takahashi | G02B 27/0093 |
| | | | | 349/15 |
| 2014/0192169 | A1 * | 7/2014 | Kashiwagi | H04N 13/398 |
| | | | | 348/51 |
| 2016/0219260 | A1 * | 7/2016 | Sato | H04N 13/305 |
| 2016/0373733 | A1 * | 12/2016 | Kroon | G02B 30/27 |
| 2017/0272736 | A1 * | 9/2017 | Li | H04N 13/31 |
| 2018/0152550 | A1 * | 5/2018 | Dharmatilleke | H04N 23/55 |

FOREIGN PATENT DOCUMENTS

| | | | | | | |
|---|---|---|---|---|---|---|
| JP | 2015099321 | A | * | 5/2015 | | G02B 27/2214 |
| KR | 20070032194 | A | * | 3/2007 | | |
| WO | WO-2021178397 | A1 | * | 9/2021 | | G02B 30/27 |

OTHER PUBLICATIONS

Oliver Schreer et al. (Eds.), 3D Videocommunications; Algorithms, Concepts and Real-Time Systems in Human Center Communication (2005). (Year: 2005).*

Jason Geng, Three-dimensional Display Technologies, 5 Advances in Optics and Photonics 456-535 (2013). (Year: 2013).*

English translation of communication issued Jun. 9, 2026 in Chinese Application No. 2022-11256776.0 (Year: 2026).*

Communication issued Jun. 9, 2026 in Chinese Application No. 2022-112567776.0.

* cited by examiner

LENS PITCH, VIEWPOINT PITCH, AND OPTIMAL VIEWING DISTANCE

|  | EXAMPLE 1 | EXAMPLE 2 | COMPARATIVE EXAMPLE 1 | COMPARATIVE EXAMPLE 2 |
|---|---|---|---|---|
| FIRST LENS ELEMENT |  |  |  |  |
| N1 | 2 | 2 | 2 | 2 |
| H1(mm) | 0.5 | 0.5 | 0.5 | 0.5 |
| Lp1($\mu$m) | 119.9 | 119.9 | 119.9 | 119.9 |
| OD1(mm) | 399 | 399 | 399 | 399 |
| e1(mm) | 71.9 | 71.9 | 71.9 | 71.9 |
| SECOND LENS ELEMENT |  |  |  |  |
| N2 | 6 | 9 | 6 | 9 |
| H2(mm) | 1.5 | 1.5 | 1.5 | 1.5 |
| Lp2($\mu$m) | 359.4 | 539.1 | 359.7 | 539.55 |
| OD2(mm) | 599 | 599 | 1199 | 1199 |
| e2(mm) | 35.9 | 35.9 | 71.9 | 71.9 |

LENS PITCH, VIEWPOINT PITCH,
AND OPTIMAL VIEWING DISTANCE

|  | EXAMPLE 3 | EXAMPLE 4 |
|---|---|---|
| FIRST LENS ELEMENT |  |  |
| N1 | 2 | 2 |
| H1(mm) | 0.5 | 0.5 |
| Lp1($\mu$m) | 119.9 | 119.9 |
| OD1(mm) | 399 | 399 |
| e1(mm) | 71.9 | 71.9 |
| SECOND LENS ELEMENT |  |  |
| N2 | 6 | 9 |
| H2(mm) | 1.5 | 2.2 |
| Lp2($\mu$m) | 359.1 | 538 |
| OD2(mm) | 399 | 399 |
| e2(mm) | 24 | 16 |

FIG.18

LENS PITCH, VIEWPOINT PITCH,
AND OPTIMAL VIEWING DISTANCE

|  | EXAMPLE 5 |
|---|---|
| FIRST LENS ELEMENT |  |
| N1 | 2 |
| H1(mm) | 0.5 |
| Lp1($\mu$m) | 120.1 |
| OD1(mm) | 399 |
| e1(mm) | 72.1 |
| SECOND LENS ELEMENT |  |
| N2 | 6 |
| H2(mm) | 1 |
| Lp2($\mu$m) | 359.1 |
| OD2(mm) | 266 |
| e2(mm) | 23.9 |

LENS PITCH, VIEWPOINT PITCH,
AND OPTIMAL VIEWING DISTANCE

|  | EXAMPLE 6 |
|---|---|
| FIRST LENS ELEMENT |  |
| N1 | 2 |
| H1(mm) | 0.5 |
| Lp1($\mu$m) | 119.9 |
| OD1(mm) | 400 |
| e1(mm) | 71.9 |
| SECOND LENS ELEMENT |  |
| N2 | 6 |
| H2(mm) | 1 |
| Lp2($\mu$m) | 360.9 |
| OD2(mm) | 266 |
| e2(mm) | 24.1 |

DISPLAY DEVICE

CROSS-REFERENCE TO RELATED APPLICATION

This application claims the benefit of Japanese Patent Application No. 2021-172132, filed on Oct. 21, 2021, the entire disclosure of which is incorporated by reference herein.

FIELD

The present disclosure relates generally to a display device.

BACKGROUND

Display devices are known that display two-dimensional images (2D images) and three-dimensional image (3D images) without using eye wear. Furthermore, display devices are known that are capable of switching the number of viewpoints when displaying a three-dimensional image. Display devices that are capable of switching the number of viewpoints can display high-resolution three-dimensional images by reducing the number of viewpoints. Additionally, display devices that are capable of switching the number of viewpoints can impart motion parallax to three-dimensional images by increasing the number of viewpoints. For example, the image display device of Japanese Patent No. 5694556 includes an optical element for which a refractive index distribution changes in accordance with an applied voltage, a voltage controller that controls the voltage applied to the optical element so that the optical element acts as two Fresnel lenses having different numbers of steps, and a display that displays an image.

With the image display device of Japanese Patent No. 5694556, the number of parallaxes (the number of viewpoints) is switched by switching the lens pitch of the Fresnel lens in the optical element. Additionally, in Japanese Patent No. 5694556, when Lp_1 is the lens pitch of the Fresnel lens in a first mode in which the number of parallaxes is few, and Lp_2 is the lens pitch of the Fresnel lens in a second mode in which the number of parallaxes is great, the relationship Lp_1×m=Lp_2×n (where n is an integer of 1 or greater, and m is an integer greater than n) is satisfied.

When the number of viewpoints is few, it is desirable that the image display device has a wider viewpoint pitch at an optimal viewing distance in order to prevent reverse viewing. Meanwhile, when the number of viewpoints is great, it is desirable that the image display device has a narrow viewpoint pitch in order to smooth the motion parallax. The optimal viewing distance is a distance at which a viewpoint region is largest. The viewpoint pitch is the width of the viewpoint region. The viewpoint pitch is determined on the basis of the optimal viewing distance, a pixel pitch, a gap between the lens and the pixels, and the refractive index of the lens. However, with the image display device of Japanese Patent 5694556, even when the lens pitch is switched by the voltage control, the gap between the lens and the pixels, the refractive index of the lens, and the like do not change and, as such, the viewpoint pitch does not change.

SUMMARY

A display device of the present disclosure includes:
an image display that includes a plurality of pixels, and that displays parallax images corresponding to each of N1 viewpoints along a predetermined direction and parallax images corresponding to each of N2 viewpoints along the predetermined direction, N1 being an integer of 2 or greater and N2 being an integer greater than N1;
a first lens element that is stacked on the image display and that, when the parallax images corresponding to each of the N1 viewpoints are displayed on the image display, divides light, emitted from the plurality of pixels displaying each of the parallax images, among each of the N1 viewpoints corresponding to each of the parallax images; and
a second lens element that is stacked on the image display and that, when the parallax images corresponding to each of the N2 viewpoints are displayed on the image display, divides the light, emitted from the plurality of pixels displaying each of the parallax images, among each of the N2 viewpoints corresponding to each of the parallax images. It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 18 is a schematic view illustrating an optical model of the three-dimensional image display at N2 viewpoints at the center of the display device according to Embodiment 3;

FIG. 21 is a schematic drawing illustrating a cross-section of a display device according to Embodiment 4; and FIG. 22 is a drawing illustrating values of the lens pitch, values of the viewpoint pitch, and values of the optimal viewing distance of example 6 according to Embodiment 4.

DETAILED DESCRIPTION

Hereinafter, a display device according to various embodiments is described while referencing the drawings.

Embodiment 1

Figure 1:
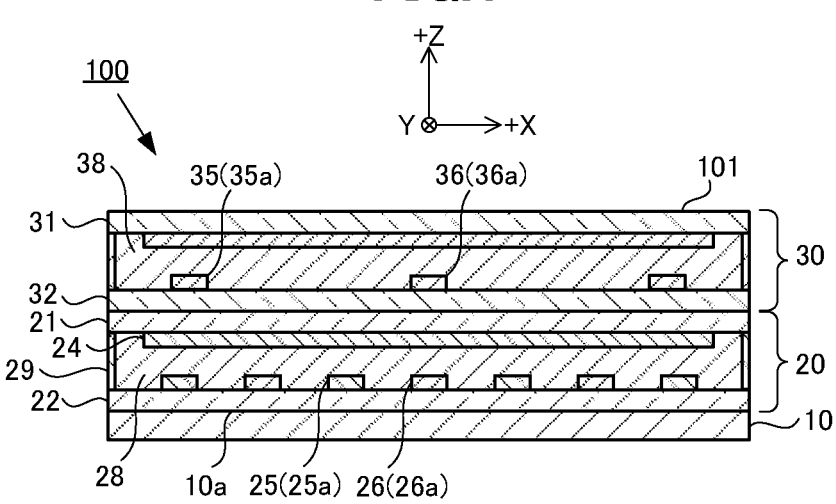
FIG. 1 is a schematic drawing illustrating a cross-section of a display device according to Embodiment 1.

A display device 100 according to the present embodiment is described while referencing FIGS. 1 to 10. The display device 100 displays a two-dimensional image and a three-dimensional image. Furthermore, when displaying the three-dimensional image, the display device 100 can switch a number of viewpoints to N1 viewpoints (where N1 is an integer of 2 or greater) and to N2 viewpoints (where N2 is an integer greater than N1). As illustrated in FIG. 1, the display device 100 includes an image display 10, a first lens element 20, and a second lens element 30. In the present specification, to facilitate comprehension, a description is given in which, in FIG. 1, the right direction (the right direction on paper) of the display device 100 is referred to as the "+X direction", the up direction (the up direction on paper) is referred to as the "+Z direction", and the direction perpendicular to the +X direction and the +Z direction (the depth direction on paper) is referred to as the "+Y direction."

In the present embodiment, the first lens element 20 and the second lens element 30 are sequentially stacked on a display surface 10a of the image display 10. When the display device 100 displays the two-dimensional image, the two-dimensional image that is being displayed on the image display 10 is displayed, without the first lens element 20 and the second lens element 30 functioning as lenses. When the display device 100 displays the three-dimensional image at the N1 viewpoints, only the first lens element 20 functions as a lens. When the display device 100 displays the three-dimensional image at the N2 viewpoints, only the second lens element 30 functions as a lens.

The image display 10 of the display device 100 displays the two-dimensional image, parallax images corresponding to each of the N1 viewpoints (where N1 is an integer of 2 or greater) along the X direction, and parallax images corresponding to each of the N2 viewpoints (where N2 is an integer greater than N1) along the X direction. The image display 10 includes a plurality of pixels 12 arranged in a matrix.

Figure 2:
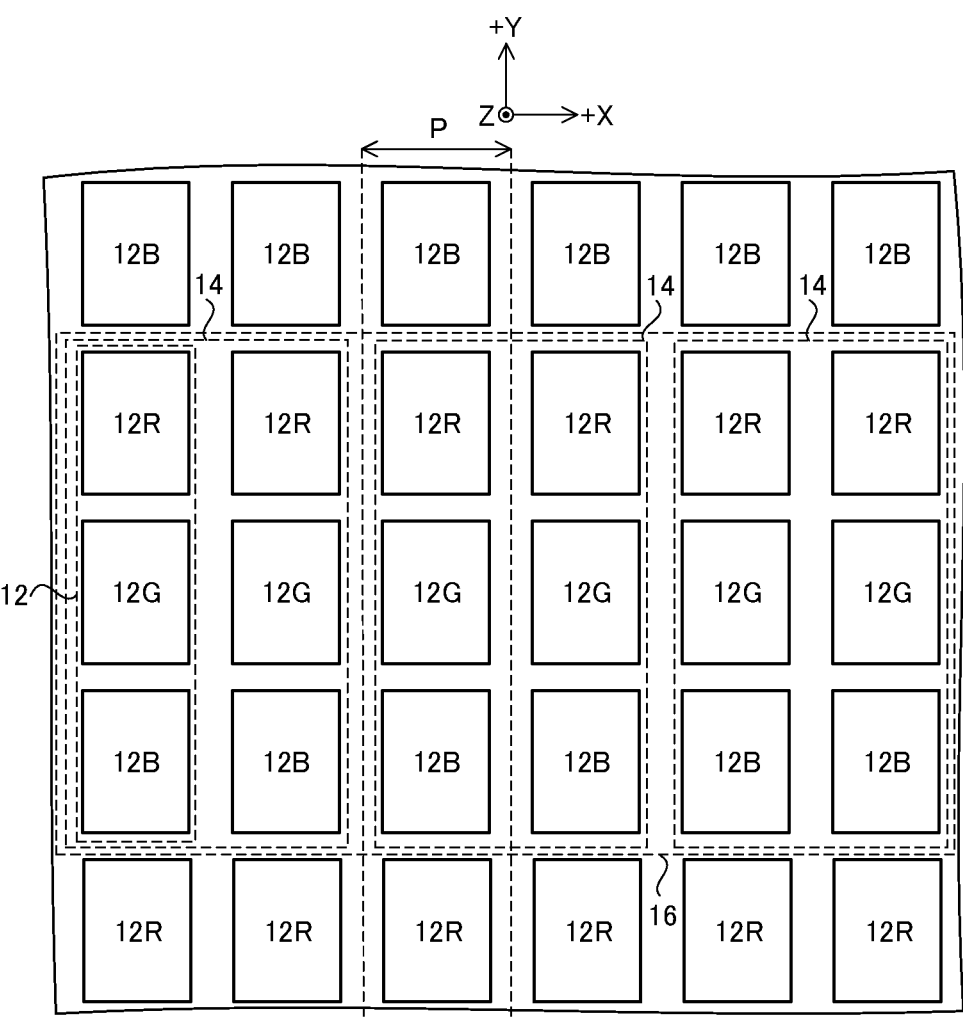
FIG. 2 is a top view illustrating pixels of an image display according to Embodiment 1.

FIG. 2 illustrates the pixels 12 of the image display 10. As illustrated in FIG. 2, the pixels 12 are formed from a red (R) subpixel 12R, a green (G) subpixel 12G, and a blue (B) subpixel 12B arranged in the Y direction. The subpixel 12R, the subpixel 12G, and the subpixel 12B are repeatedly arranged in order in the Y direction, and the subpixels 12R, 12G, and 12B of the same color are arranged in the X direction at the pixel pitch P (horizontal stripe arrangement). In the present embodiment, when displaying the three-dimensional image at the N1 viewpoints, N1 pixels 12 adjacent in the X direction display parallax images corresponding to the N1 viewpoints. In the present specification, the N1 pixels 12 adjacent in the X direction that display the parallax images are referred to as a first pixel unit 14. When P is the pitch of the pixels 12, the pitch of the first pixel unit 14 is P×N1. Note that FIG. 2 illustrates a first pixel unit 14 in which N1=2.

When displaying the three-dimensional image at the N2 viewpoints, N2 pixels 12 adjacent in the X direction display parallax images corresponding to the N2 viewpoints. In the present specification, the N2 pixels 12 adjacent in the X direction that display the parallax images are referred to as a second pixel unit 16. The pitch of the second pixel unit 16 is P×N2. Note that FIG. 2 illustrates a second pixel unit 16 in which N2=6. In one example, the image display 10 is implemented as an organic electro-luminescence (EL) display panel.

Figure 3:
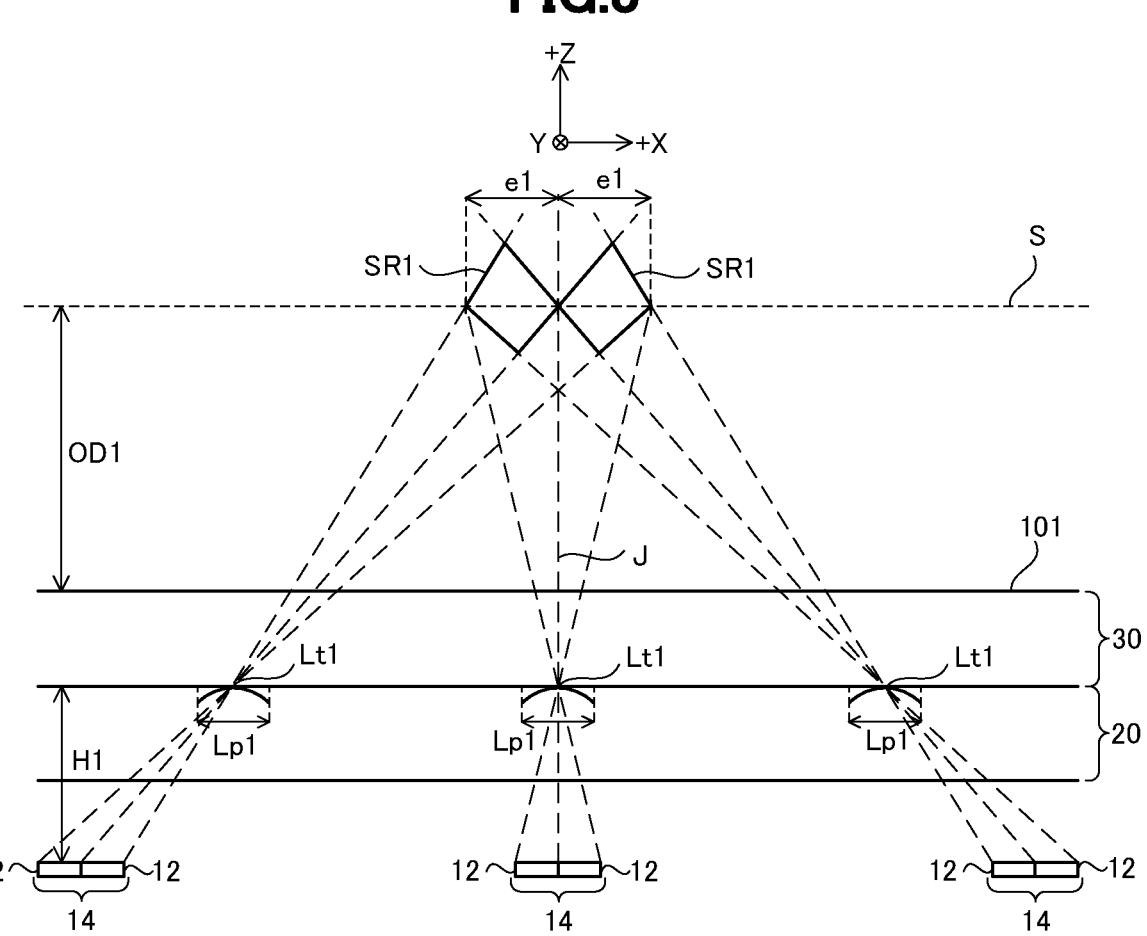
FIG. 3 is a schematic view illustrating a three-dimensional image display (N1=2) in an XZ cross-section that includes a display device center line perpendicular to a display surface, according to Embodiment 1.

The first lens element 20 of the display device 100 is stacked on the image display 10, and is disposed on the display surface 10a side of the image display 10. When the parallax images corresponding to each of the N1 viewpoints are displayed on the image display 10, as illustrated in FIG. 3, the first lens element 20 divides light, emitted from the pixels 12 included in the first pixel unit 14 displaying the parallax images, among each of the N1 viewpoints corresponding to the parallax images. Note that, in FIG. 3, reference numeral H1 represents a gap between the pixels 12 and an apex Lt1 of the lens of the first lens element 20. Reference numeral J represents the center line, which is perpendicular to a display surface 101, of the display device 100.

Specifically, when parallax images corresponding to each of the N1 viewpoints are displayed on the image display 10, the first lens element 20 functions as a lenticular lens array in which lenticular lenses extending in the Y direction are arranged in the X direction. One of the lenticular lenses of the first lens element 20 divides the light, emitted from the first pixel unit 14 displaying the N1 parallax images adjacent in the X direction, among the N1 viewpoints along the X direction. In the present embodiment, the lens pitch Lp1 in the X direction of the first lens element 20 is set slightly smaller than the pitch P×N1 of the first pixel unit 14. Additionally, a focal distance of the first lens element 20 is set so as to be substantially equal to the gap H1 between the apex Lt1 of the lens and the pixels 12.

Furthermore, in the present embodiment, since the lens pitch Lp1 of the first lens element 20 is set slightly smaller than the pitch P×N1 of the first pixel unit 14, the light emitted from the pixels 12 corresponding to each of the N1 viewpoints of the first pixel unit 14 overlaps in a viewpoint region SR1, regardless of the position of the first pixel unit 14 in the image display 10. The viewpoint region SR1 refers to a region in which, when the right eye or the left eye of the observer is positioned, an observer can observe only the parallax image corresponding to each of the viewpoints. In the present specification, a distance in the +Z direction, between the display surface 101 of the display device 100 and an observation plane S, at which a width in the X direction of the viewpoint region SR1 can be made widest, is defined as an optimal viewing distance OD1. Additionally, in the present specification, a width of a projected image (period of the projected image), obtained by projecting the pixels 12 on the observation plane S disposed at the optimal viewing distance OD1, is defined as a viewpoint pitch e1.

Figure 4:
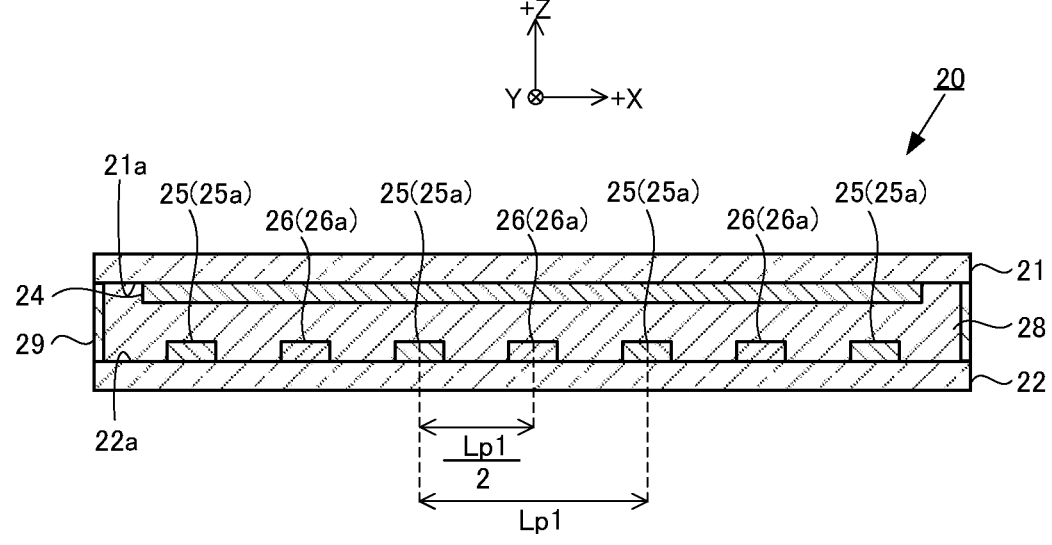
FIG. 4 is a schematic view illustrating a cross-section of a first lens element according to Embodiment 1.

In one example, the first lens element 20 is implemented as a liquid crystal lens that functions as a lenticular lens array. As illustrated in FIG. 4, the first lens element (liquid crystal lens) 20 includes a first substrate 21, a second substrate 22, a first electrode 24, second electrodes 25 and 26, and a liquid crystal 28. In the present embodiment, as illustrated in FIG. 1, the second substrate 22 is disposed on the display surface 10a of the image display 10.

The first substrate 21 and the second substrate 22 are light transmitting substrates. In one example, the first substrate 21 and the second substrate 22 are implemented as flat glass substrates. As illustrated in FIG. 4, the first substrate 21 and the second substrate 22 are affixed to each other by a seal material 29, and sandwich the liquid crystal 28.

The first electrode 24 is formed in a rectangular shape on a first main surface 21a of the first substrate 21. The first electrode 24 is formed from indium tin oxide (ITO). The first electrode 24 faces comb teeth 25a of the second electrode 25 and comb teeth 26a of the second electrode 26 that are described later. The first electrode 24 is connected to a non-illustrated controller.

Figure 5:
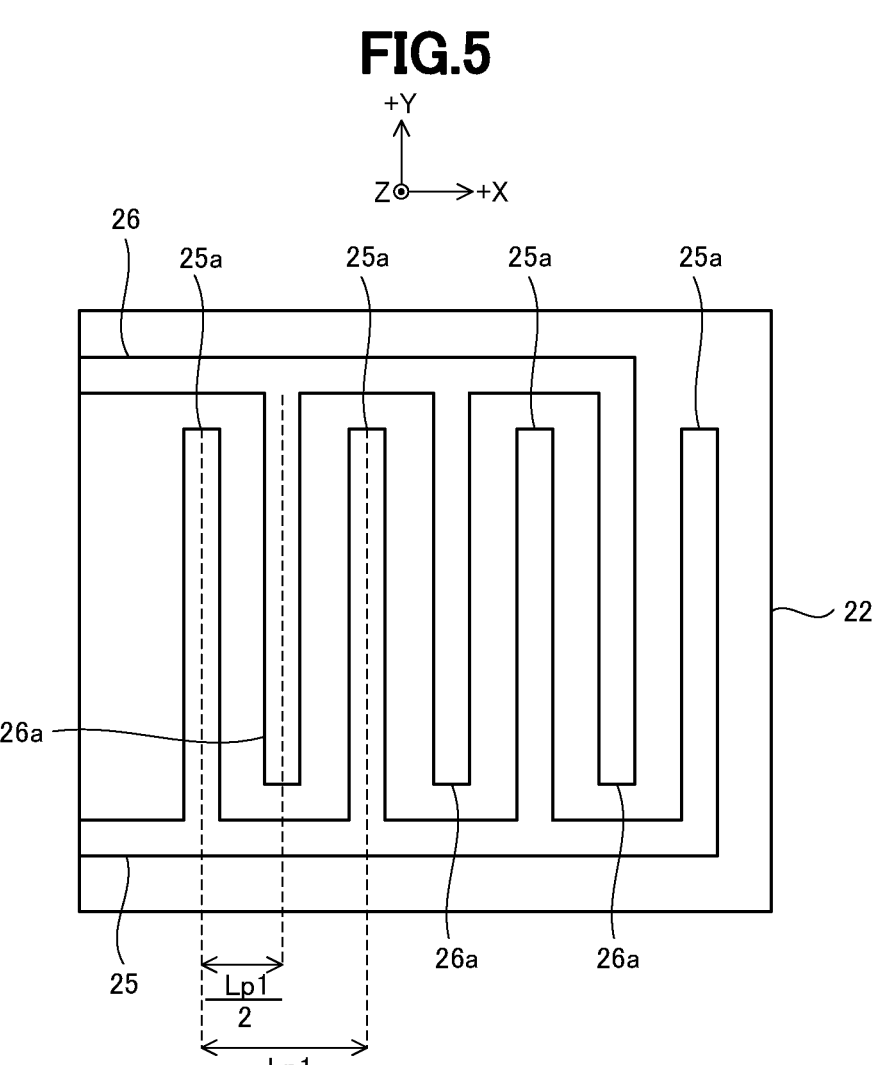
FIG. 5 is a top view illustrating a second substrate of the first lens element according to Embodiment 1.

The second electrode 25 and the second electrode 26 are formed in comb teeth shapes on the first main surface 22a of the second substrate 22. The second electrode 25 and the second electrode 26 are formed from ITO. As illustrated in FIG. 5, the second electrode 25 and the second electrode 26 respectively include the comb teeth 25a and the comb teeth 26a. The comb teeth 25a extend in the +Y direction, and the comb teeth 26a extend in the −Y direction. The comb teeth 25a and the comb teeth 26a are disposed parallel to each other in an alternating manner along the X direction. When viewing the display device 100 from the +Z direction, a gap between center lines of the comb teeth 25a is the lens pitch Lp1 in the X direction of the first lens element 20, and a gap between a center line of a comb tooth 25a and a center line of a comb tooth 26a adjacent thereto is ½ of Lp1. As with the first electrode 24, the second electrodes 25 and 26 are connected to the controller.

The liquid crystal 28 is sandwiched between the first substrate 21 and the second substrate 22. In one example, the liquid crystal 28 is implemented as a positive nematic liquid crystal. The liquid crystal 28 is aligned in the X direction by a non-illustrated alignment film.

Next, the operations of the first lens element 20 are described. In one example, when the potentials of the first electrode 24 and the second electrodes 25 and 26 are set to the same potential (for example, ground potential) by the controller, voltage is not applied to the liquid crystal 28 and, as such, the liquid crystal 28 maintains the alignment in the X direction. Lens effects do not occur while the alignment of the liquid crystal 28 in the X direction is maintained, and, as such, the first lens element 20 does not function as a lenticular lens array.

Figure 6:
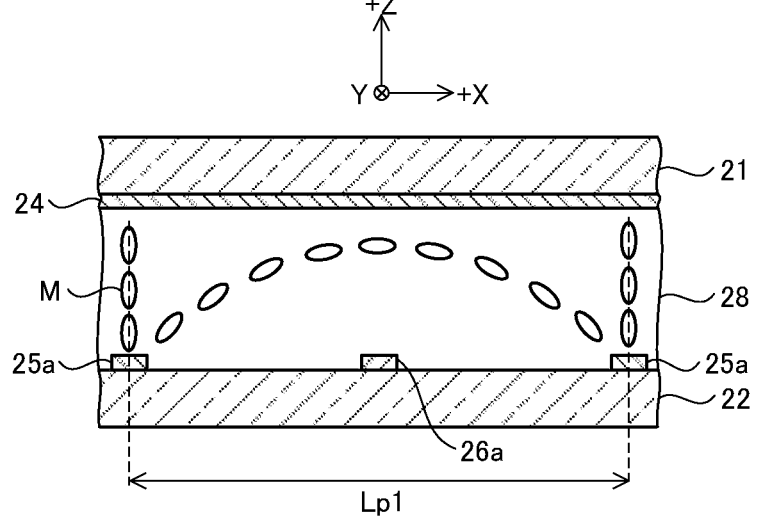
FIG. 6 is a schematic view for explaining the operations of the first lens element according to Embodiment 1.

Meanwhile, potential having a quadratic curve shape is formed between the first substrate 21 and the second substrate 22 as a result of individually controlling the voltage applied between the first electrode 24 and the second electrode 25 and the voltage applied between the first electrode 24 and the second electrode 26 of the second substrate. Molecules M of the liquid crystal 28 are aligned as illustrated in FIG. 6 due to the formed quadratic curve-shaped potential. When the alignment of the liquid crystal 28 changes, a refractive index distribution along the quadratic curve-shape potential occurs in the first lens element 20, and the first lens element 20 functions as a lenticular lens array extending in the Y direction. The lens pitch of the formed lenticular lens array is Lp1. Additionally, the focal distance of the formed lenticular lens array is substantially equivalent to the gap H1. As a result, when the parallax images corresponding to each of the N1 viewpoints are displayed on the image display 10, the display device 100 can display the three-dimensional image at the N1 viewpoints.

The second lens element 30 of the display device 100 is disposed on the display surface 10a side of the image display 10. In the present embodiment, the second lens element 30 is disposed on the first lens element 20.

Figure 7:
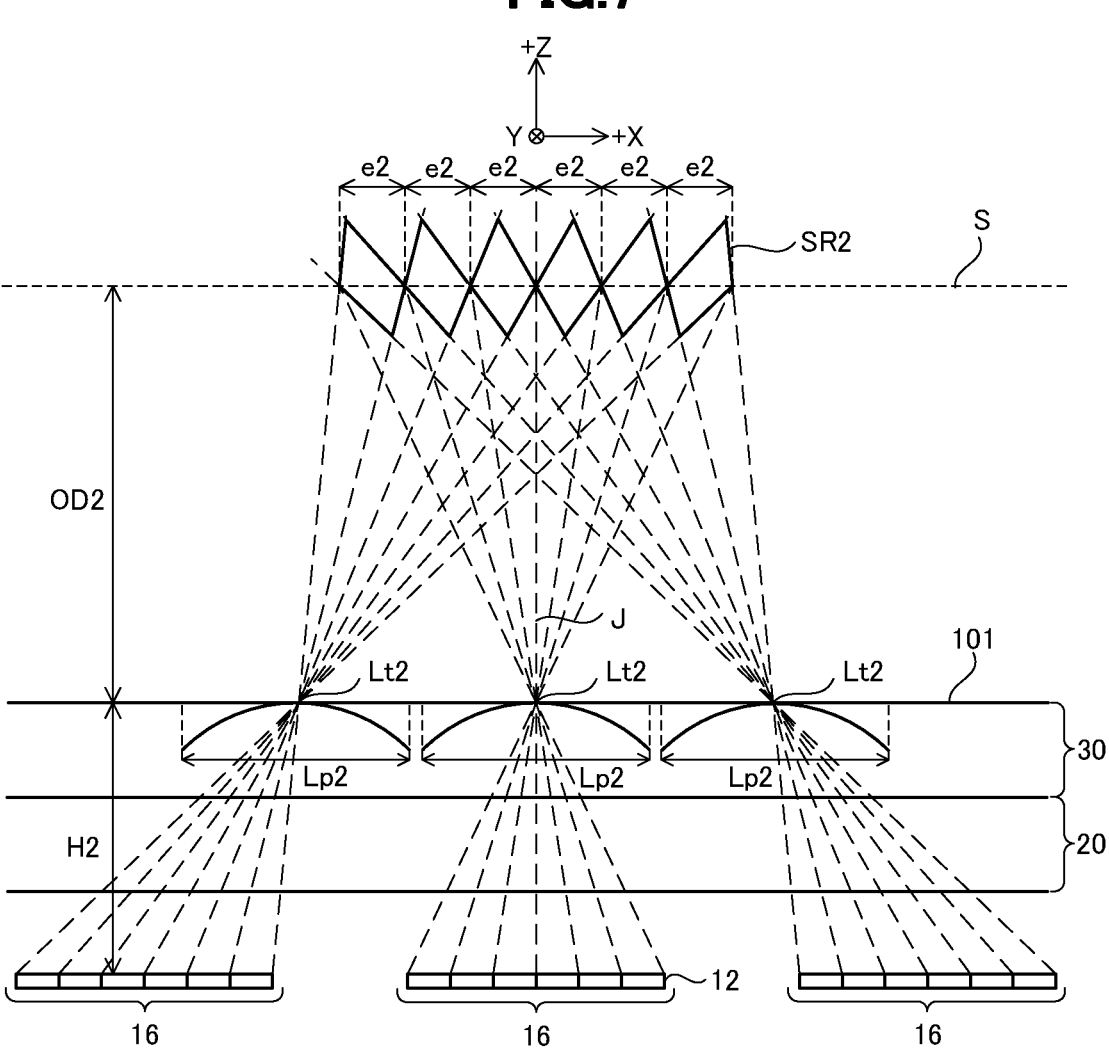
FIG. 7 is a schematic view illustrating the three-dimensional image display (N1=6) in the XZ cross-section that includes the display device center line perpendicular to the display surface, according to Embodiment 1.

When the parallax images corresponding to each of the N2 viewpoints are displayed on the image display 10, as illustrated in FIG. 7, the second lens element 30 divides light, emitted from the pixels 12 included in the second pixel unit 16 displaying the parallax images, among each of the N2 viewpoints corresponding to the parallax images. Note that, in FIG. 7, reference numeral H2 represents a gap between the pixels 12 and an apex Lt2 of the lens of the second lens element 30.

Specifically, when parallax images corresponding to each of the N2 viewpoints are displayed on the image display 10, the second lens element 30 functions as a lenticular lens array in which lenticular lenses extending in the Y direction are arranged in the X direction. One of the lenticular lenses of the second lens element 30 divides the light, emitted from the second pixel unit 16 displaying the N2 parallax images adjacent in the X direction, among the N2 viewpoints along the X direction. In the present embodiment, the lens pitch Lp2 in the X direction of the second lens element 30 is set slightly smaller than the pitch P×N2 of the second pixel unit 16. Additionally, a focal distance of the second lens element 30 is set so as to be substantially equal to the gap H2 between the apex Lt2 of the lens and the pixels 12.

Furthermore, since the lens pitch Lp2 of the second lens element 30 is set slightly smaller than the pitch P×N2 of the second pixel unit 16, the light emitted from the pixels 12 corresponding to each of the N2 viewpoints of the second pixel unit 16 overlaps in a viewpoint region SR2, regardless of the position of the second pixel unit 16 in the image display 10. As with the viewpoint region SR1, the viewpoint region SR2 refers to a region in which, when the right eye or the left eye of the observer is positioned, an observer can observe only the parallax image corresponding to each of the viewpoints. In the present specification, a distance in the +Z direction, between the display surface 101 of the display device 100 and the observation plane S, at which a width in the X direction of the viewpoint region SR2 can be made widest is defined as an optimal viewing distance OD2. Additionally, in the present specification, a width of a projected image (period of the projected image), obtained by projecting the pixels 12 on the observation plane S disposed at the optimal viewing distance OD2, is defined as a viewpoint pitch e2.

Figure 8:
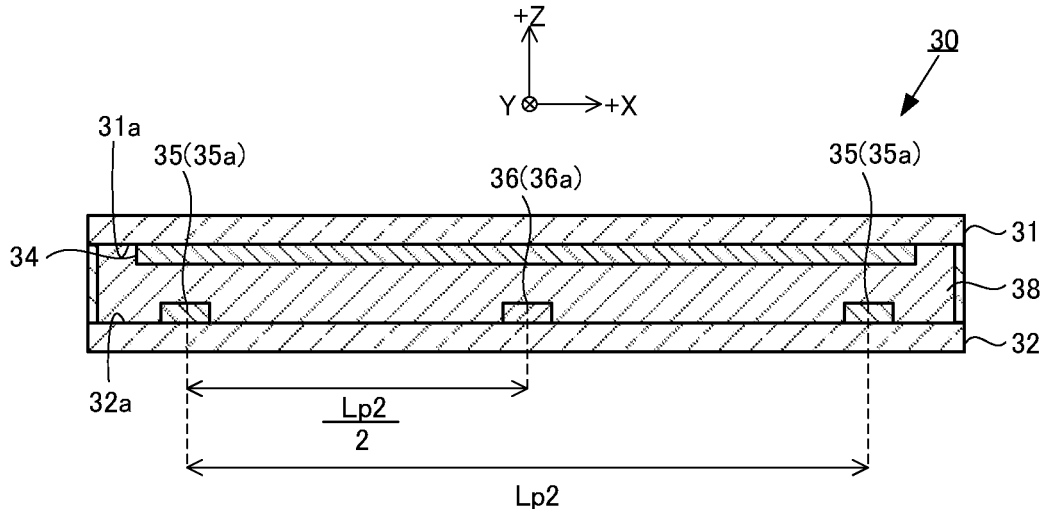
FIG. 8 is a schematic view illustrating a cross-section of a second lens element according to Embodiment 1.

As with the first lens element 20, the second lens element 30 is implemented as a liquid crystal lens that functions as a lenticular lens array. As illustrated in FIG. 8, the second lens element (liquid crystal lens) 30 includes a third substrate 31, a fourth substrate 32, a third electrode 34, fourth electrodes 35 and 36, and a liquid crystal 38. In the present embodiment, as illustrated in FIG. 1, the fourth substrate 32 is disposed on the first substrate 21 of the first lens element 20. The third substrate 31, the fourth substrate 32, and the liquid crystal 38 of the second lens element 30 are the same as the first substrate 21, the second substrate 22, and the liquid crystal 28 of the first lens element 20 and, as such, the third electrode 34 and the fourth electrodes 35 and 36 are described.

The third electrode 34 is formed in a rectangular shape on a first main surface 31*a* of the third substrate 31. The third electrode 34 is formed from ITO. The third electrode 34 faces comb teeth 35*a* of the fourth electrode 35 and comb teeth 36*a* of the fourth electrode 36 that are described later. The third electrode 34 is connected to a non-illustrated controller.

Figures 9, 10:
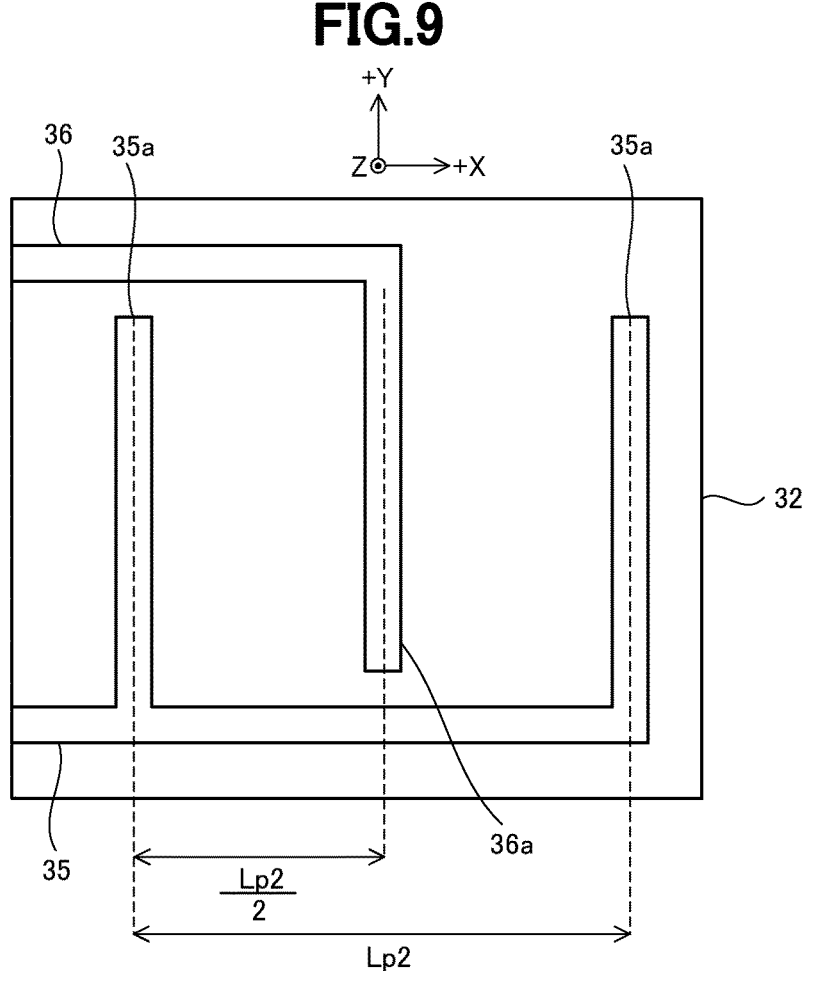
FIG. 9 is a top view illustrating a fourth substrate of the second lens element according to Embodiment 1.
FIG. 10 is a drawing illustrating values of a lens pitch, values of a viewpoint pitch, and values of an optimal viewing distance of example 1, example 2, comparative example 1, and comparative example 2 according to Embodiment 1.

The fourth electrode 35 and the fourth electrode 36 are formed in comb teeth shapes on a first main surface 32*a* of the fourth substrate 32. The fourth electrode 35 and the fourth electrode 36 are formed from ITO. As illustrated in FIG. 9, the fourth electrode 35 and the fourth electrode 36 respectively include the comb teeth 35*a* and the comb teeth 36*a*. The comb teeth 35*a* extend in the +Y direction, and the comb teeth 36*a* extend in the −Y direction. The comb teeth 35*a* and the comb teeth 36*a* are disposed parallel to each other in an alternating manner along the X direction. When viewing the display device 100 from the +Z direction, a gap between center lines of the comb teeth 35*a* is the lens pitch Lp2 in the X direction of the second lens element 30, and a gap between a center line of a comb tooth 35*a* and a center line of a comb tooth 36*a* adjacent thereto is ½ of Lp2. As with the third electrode 34, the fourth electrodes 35 and 36 are connected to the controller.

When the potentials of the third electrode 34 and the fourth electrodes 35 and 36 are set to the same potential by the controller, voltage is not applied to the liquid crystal 38 and, as such, lens effects do not occur in the second lens element 30. Accordingly, the second lens element 30 does not function as a lenticular lens array. Meanwhile, as with the first lens element 20, the second lens element 30 functions as a lenticular lens array extending in the Y direction as a result of individually controlling the voltage applied between the third electrode 34 and the fourth electrode 35 and the voltage applied between the third electrode 34 and the fourth electrode 36. The lens pitch of the formed lenticular lens array is Lp2. Additionally, the focal distance of the formed lenticular lens array is substantially equivalent to the gap H2. As a result, when the parallax images corresponding to each of the N2 viewpoints are displayed on the image display 10, the display device 100 can display the three-dimensional image at the N2 viewpoints.

In the present embodiment, the lens pitch Lp2 in the X direction of the second lens element 30 satisfies the conditions of equation (1) below.

$$Lp1 \times \frac{N2}{N1} > Lp2 > (N2 - 1) \times P \qquad (1)$$

As a result of satisfying the conditions of equation (1), the viewpoint pitch e2 in the three-dimensional image display at the N2 (where N2>N1) viewpoints can be made narrower than the viewpoint pitch e1 in the three-dimensional image display at the N1 (integer of 2 or greater) viewpoints. For example, when the image display 10 is a 6.9 inch-diagonal wide quad high definition (WQHD) display having a pixel pitch P of 60 µm, the conditions of the first lens element 20 are set to N1=2, H1=0.5 mm, Lp1=119.9 µm, OD1=399 mm, and e1=71.9 mm, and the gap H2 between the apex Lt2 of the lens and of the second lens element 30 and the pixels 12 is set to H2=1.5 mm, the conditions of equation (1) are satisfied and the viewpoint pitch e2 can be made narrower than the viewpoint pitch e1, as illustrated in example 1 and example 2 of FIG. 10. However, when, as illustrated in comparative example 1 and comparative example 2 of FIG. 10, Lp1×(N2/N1)=Lp2 is satisfied, the viewpoint pitch e2 cannot be made narrower than the viewpoint pitch e1.

Furthermore, as illustrated in FIG. 10, as a result of satisfying the conditions of equation (1), it is possible to reduce the difference between the optimal viewing distance OD2 in the three-dimensional image display at the N2 viewpoints and the optimal viewing distance OD1 in the three-dimensional image display at the N1 viewpoints. Due to this, it is possible to reduce movement in the Z direction of the observer when switching the number of viewpoints.

Note that the values of the viewpoint pitch e2, the optimal viewing distance OD2, and the like illustrated in FIG. 10 can be obtained from an optical model. Additionally, typically, the optimal viewing distances OD1 and OD2 are dependent on the size of the image display 10. For example, when the size of the image display 10 is from 4 to 13 inches diagonally, it is preferable that the optimal viewing distances OD1 and OD2 be from 150 mm to 750 mm. When the size of the image display 10 is from 14 to 30 inches diagonally, it is preferable that the optimal viewing distances OD1 and OD2 be from 250 mm to 1300 mm.

As described above, the display device 100 can switch the number of viewpoints to N1 (integer of 2 or greater) and N2 (where N2>N1) when displaying the three-dimensional image, and the viewpoint pitch e2 in the three-dimensional image display at the N2 viewpoints can be made narrower than the viewpoint pitch e1 in the three-dimensional image display at the N1 viewpoints. That is, the viewpoint pitch in the three-dimensional image display in which the number of viewpoints is great can be made narrower than the viewpoint pitch in the three-dimensional image display in which the number of viewpoints is few. Furthermore, it is possible to reduce the difference between the optimal viewing distance OD1 and the optimal viewing distance OD2 when switching the number of viewpoints.

Embodiment 2

In Embodiment 1, the lens pitch Lp2 of the second lens element 30 satisfies the conditions of equation (1). However, in the present embodiment, the gap H2 and the lens pitch Lp2 of the second lens element 30 respectively satisfy the conditions of equation (2) and the conditions of equation (3) below. The other configurations of the present embodiment are the same as described in Embodiment 1. Note that the conditions of equation (1) are satisfied when the conditions of equation (2) and equation (3) are satisfied.

$$H2 = \frac{H1 \times (e1 + P)}{e2 + P} \qquad (2)$$

-continued $$Lp2 = N2 \times \frac{N1 \times P \times (e2-e1) + Lp1 \times (e1 + P)}{N1 \times (e2 + P)} \qquad (3)$$

As a result of satisfying the conditions of equation (2) and equation (3), the viewpoint pitch e2 in the three-dimensional image display at the N2 viewpoints can be made narrower than the viewpoint pitch e1 in the three-dimensional image display at the N1 viewpoints. Furthermore, it is possible to eliminate the difference between the optimal viewing distance OD2 in the three-dimensional image display at the N2 viewpoints and the optimal viewing distance OD1 in the three-dimensional image display at the N1 viewpoints. That is, the optimal viewing distance OD1 and the optimal viewing distance OD2 can be made equal to each other. In the following, equation (2) and equation (3) are described while referencing FIGS. 11 to 15.

Figure 11:
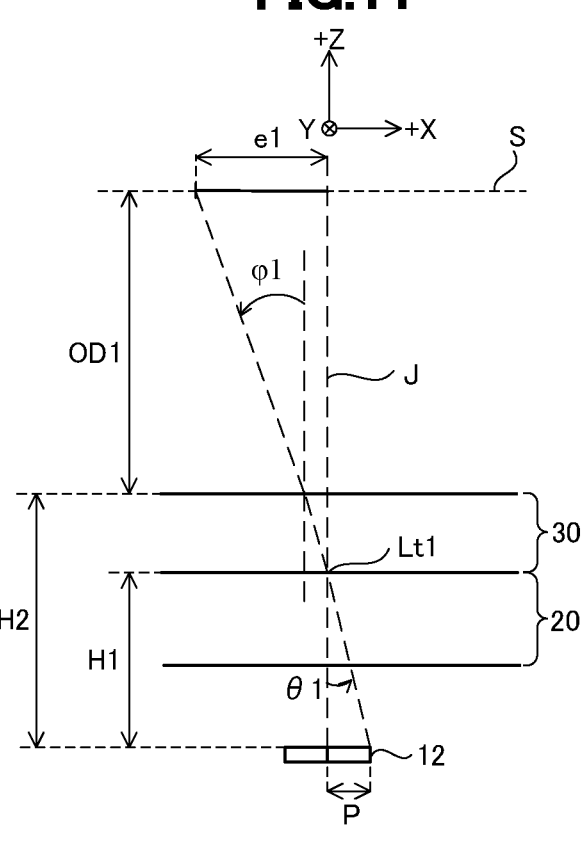
FIG. 11 is a schematic view illustrating an optical model of a three-dimensional image display at N1 viewpoints at the center of a display device, according to Embodiment 2.

Firstly, equation (2) is described. FIG. 11 illustrates an optical model (XZ cross-section) of the three-dimensional image display at the N1 viewpoints, at the center of the display device 100. In the three-dimensional image display at the N1 viewpoints, the pixels 12 having the pixel pitch P are projected through the first lens element 20 at the viewpoint pitch e1 on the observation plane S positioned at the optimal viewing distance OD1. As such, the following equations (2-1), (2-2), and (2-3) are established. Here, n represents the refractive index of the display device 100.

$$\sin\varphi1 = n \times \sin\theta1 \qquad (2\text{-}1)$$

$$\tan\varphi1 = \frac{e1 - \tan\theta1 \times (H2 - H1)}{OD1} \qquad (2\text{-}2)$$

$$\tan\theta1 = \frac{P}{H1} \qquad (2\text{-}3)$$

When $\theta1$ and $\varphi1$ are sufficiently small, approximation as sin $\theta1$=tan $\theta1$ and sin $\varphi1$=tan $\varphi1$ is possible, and the following equation (2-4) can be obtained from the equations (2-1) to (2-3).

$$OD1 = \frac{e1 \times H1}{n \times P} - \frac{H2 - H1}{n} \qquad (2\text{-}4)$$

Figure 12:
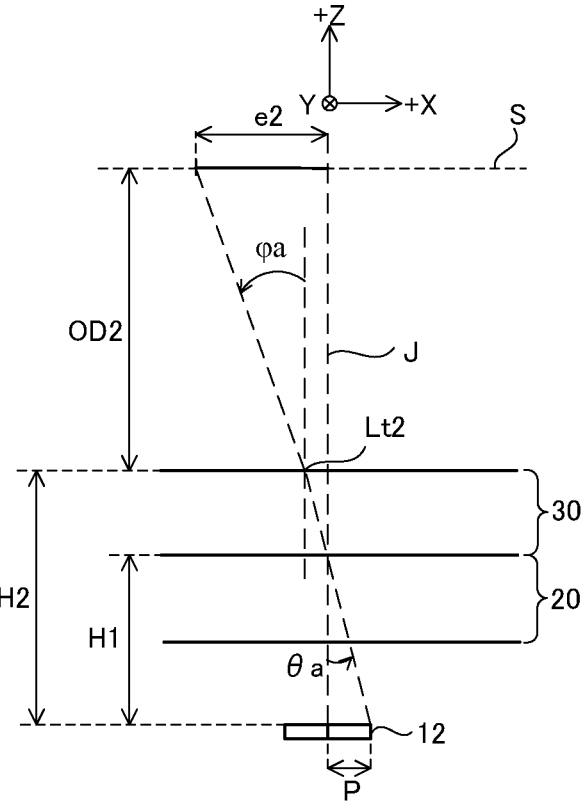
FIG. 12 is a schematic view illustrating an optical model of the three-dimensional image display at N2 viewpoints at the center of the display device, according to Embodiment 2.

FIG. 12 illustrates an optical model (XZ cross-section) of the three-dimensional image display, at the N2 viewpoints, at the center of the display device 100. In the three-dimensional image display at the N2 viewpoints, the pixels 12 having the pixel pitch P are projected through the second lens element 30 at the viewpoint pitch e2 on the observation plane S positioned at the optimal viewing distance OD2. As such, the following equations (2-5), (2-6), and (2-7) are established.

$$\sin\varphi a = n \times \sin\theta a \qquad (2\text{-}5)$$

$$\tan\varphi a = \frac{e2}{OD2} \qquad (2\text{-}6)$$

$$\tan\theta a = \frac{P}{H2} \qquad (2\text{-}7)$$

When $\theta a$ and $\varphi a$ are sufficiently small, approximation as sin $\theta a$=tan $\theta a$ and sin $\varphi a$=tan $\varphi a$ is possible, and the following equation (2-8) can be obtained from the equations (2-5) to (2-7).

$$OD2 = \frac{e2 \times H2}{n \times P} \qquad (2\text{-}8)$$

Moreover, since the optimal viewing distance OD1 and the optimal viewing distance OD2 are equivalent, equation (2) can be obtained from equations (2-4) and (2-8).

Figure 13:
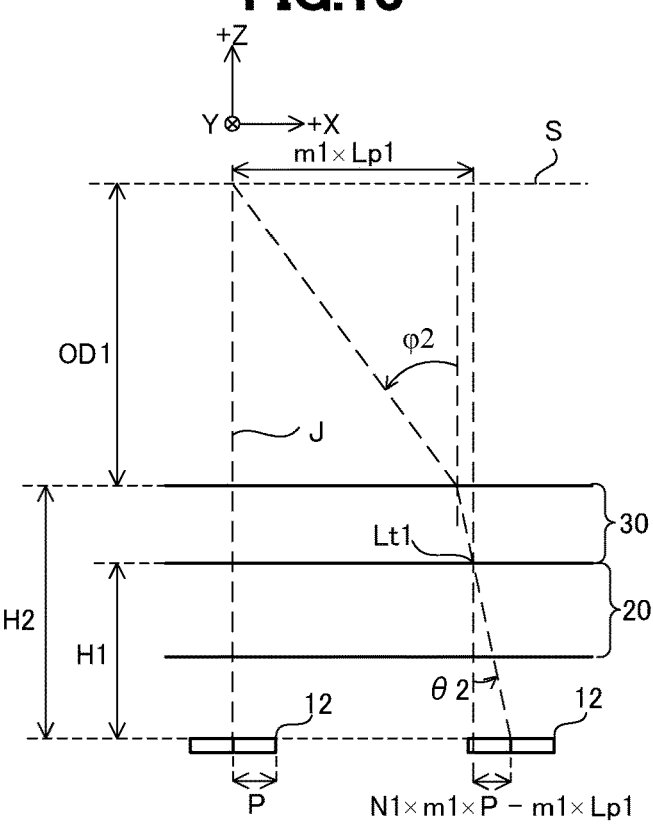
FIG. 13 is a schematic view illustrating an optical model of the three-dimensional image display at N1 viewpoints at a +X direction end of the display device, according to Embodiment 2.

Next, equation (3) is described. FIG. 13 illustrates an optical model (XZ cross-section) of the three-dimensional image display at the N1 viewpoints, at the +X direction end of the display device 100. In the three-dimensional image display at the N1 viewpoints, the lens pitch Lp1 of the first lens element 20 is set slightly smaller than the pitch P×N1 of the first pixel unit 14. As such, the following equations (3-1), (3-2), and (3-3) are established. Here, n represents the refractive index of the display device 100, and m1 represents the number of lenticular lenses in the first lens element 20, from the center of the display device 100 to the +X direction end.

$$\sin\varphi2 = n \times \sin\theta2 \qquad (3\text{-}1)$$

$$\tan\varphi2 = \frac{m1 \times Lp1 - \tan\theta2 \times (H2 - H1)}{OD1} \qquad (3\text{-}2)$$

$$\tan\theta2 = \frac{N1 \times m1 \times P - m1 \times Lp1}{H1} \qquad (3\text{-}3)$$

When $\theta2$ and $\varphi2$ are sufficiently small, approximation as sin $\theta2$=tan $\theta2$ and sin $\varphi2$=tan $\varphi2$ is possible, and the following equation (3-4) can be obtained from the equations (3-1) to (3-3).

$$OD1 = \frac{m1 \times Lp1 \times H1}{n \times (N1 \times m1 \times P - m1 \times Lp1)} - \frac{H2 - H1}{n} \qquad (3\text{-}4)$$

Figure 14:
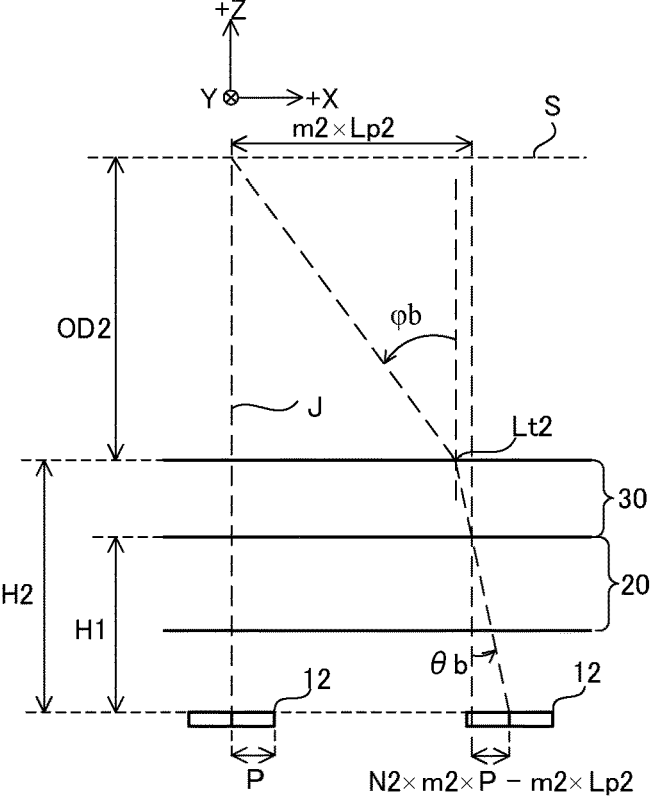
FIG. 14 is a schematic view illustrating an optical model of the three-dimensional image display at N2 viewpoints at a +X direction end of the display device, according to Embodiment 2.

FIG. 14 illustrates an optical model (XZ cross-section) of the three-dimensional image display at the N2 viewpoints, at the +X direction end of the display device 100. In the three-dimensional image display at the N2 viewpoints, the lens pitch Lp2 of the second lens element 30 is set slightly smaller than the pitch P×N2 of the second pixel unit 16. As such, the following equations (3-5), (3-6), and (3-7) are established. Here, n represents the refractive index of the display device 100, and m2 represents the number of lenticular lenses in the second lens element 30, from the center of the display device 100 to the +X direction end.

$$\sin\varphi b = n \times \sin\theta b \qquad (3\text{-}5)$$

$$\tan\varphi b = \frac{m2 \times Lp2}{OD2} \qquad (3\text{-}6)$$

$$\tan\theta b = \frac{N2 \times m2 \times P - m2 \times Lp2}{H2} \qquad (3\text{-}7)$$

When $\theta b$ and $\varphi b$ are sufficiently small, approximation as sin $\theta b$=tan $\theta b$ and sin $\varphi b$=tan $\varphi b$ is possible, and the following equation (3-8) can be obtained from the equations (3-5) to (3-7).

$$OD2 = \frac{m2 \times Lp2 \times H2}{n \times (N2 \times m2 \times P - m2 \times Lp2)} \qquad (3\text{-}8)$$

Moreover, since the optimal viewing distance OD1 and the optimal viewing distance OD2 are equivalent, equation (3) can be obtained from equations (2), (3-4) and (3-8).

Figures 15, 16:
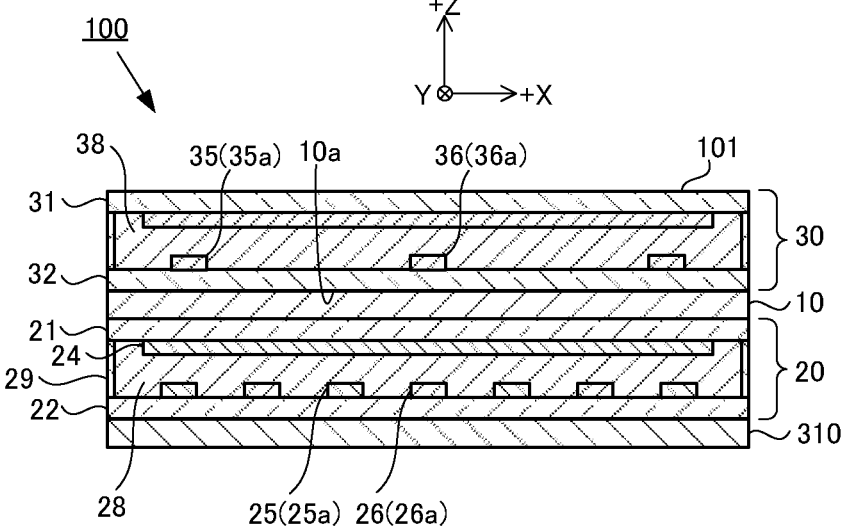
FIG. 15 is a drawing illustrating values of the lens pitch, values of the viewpoint pitch, and values of the optimal viewing distance of example 3 and example 4 according to Embodiment 2.
FIG. 16 is a schematic drawing illustrating a cross-section of a display device according to Embodiment 3.

For example, when the image display 10 is a 6.9 inch-diagonal wide quad high definition (WQHD) display having a pixel pitch P of 60 μm, as illustrated in example 3 and example 4 of FIG. 15, the conditions of equation (2) and equation (3) are satisfied and, as a result, the viewpoint pitch e2 can be made narrower than the viewpoint pitch e1, and the optimal viewing distance OD1 and the optimal viewing distance OD2 can be made equal to each other (conditions of the first lens element 20: N1=2, H1=0.5 mm, Lp1=119.9 μm, OD1=399 mm, and e1=71.9 mm).

As described above, as a result of satisfying the conditions of equation (2) and equation (3), the viewpoint pitch e2 in the three-dimensional image display at the N2 viewpoints can be made narrower than the viewpoint pitch e1 in the three-dimensional image display at the N1 viewpoints. Furthermore, the optimal viewing distance OD1 of the three-dimensional image display at the N1 viewpoints and the optimal viewing distance OD2 of the three-dimensional image display at the N2 viewpoints can be made equal to each other.

Embodiment 3

In Embodiment 1 and Embodiment 2, the first lens element 20 and the second lens element 30 are disposed on the display surface 10a side of the image display 10. However, a configuration is possible in which the first lens element 20 is disposed on a side opposite the display surface 10a side of the image display 10.

As illustrated in FIG. 16, the display device 100 of the present embodiment includes the image display 10, the first lens element 20, the second lens element 30, and a light source 310. In the present embodiment, the first lens element 20 is disposed on the side opposite the display surface 10a side of the image display 10. The second lens element 30 is disposed on the display surface 10a side of the image display 10. In the present embodiment, as in Embodiment 1, when the display device 100 displays the two-dimensional image, the two-dimensional image that is being displayed on the image display 10 is displayed, without the first lens element 20 and the second lens element 30 functioning as lenses. When the display device 100 displays the three-dimensional image at the N1 viewpoints, only the first lens element 20 functions as a lens. When the display device 100 displays the three-dimensional image at the N2 viewpoints, only the second lens element 30 functions as a lens.

In one example, the image display 10 of the present embodiment is implemented as a transmissive liquid crystal display panel. The other configurations of the image display 10 of the present embodiment are the same as the configurations of the image display 10 of Embodiment 1.

The light source 310 functions as a back light of the image display (transmissive liquid crystal display panel) 10. The light source 310 is disposed on the side opposite the display surface 10a side of the image display 10. The light source 310 includes a non-illustrated light emitting diode (LED), a diffusion sheet, and the like.

The first lens element 20 of the present embodiment is stacked on the image display 10 and is disposed between the image display 10 and the light source 310. When the parallax images corresponding to each of the N1 viewpoints are displayed on the image display 10, the first lens element 20 of the present embodiment divides light emitted from the light source 310 to divide the light, emitted from the pixels 12 included in the first pixel unit 14 displaying the parallax images, among each of the N1 viewpoints corresponding to the parallax images. As a result, the display device 100 of the present embodiment can display the three-dimensional image at the N1 viewpoints.

With the first lens element 20 of the present embodiment, the lens pitch Lp1 is set slightly larger than the pitch P×N1 of the first pixel unit 14. The other configurations of the first lens element 20 of the present embodiment are the same as the configurations of the first lens element 20 of Embodiment 1.

The second lens element 30 of the present embodiment is stacked on the image display 10 and is disposed on the display surface 10a side of the image display 10. The lens pitch Lp2 of the second lens element 30 of the present embodiment satisfies the conditions of equation (4) below. As a result of satisfying the conditions of equation (4), the viewpoint pitch e2 in the three-dimensional image display at the N2 (where N2>N1) viewpoints can be made narrower than the viewpoint pitch e1 in the three-dimensional image display at the N1 (integer of 2 or greater) viewpoints. The other configurations of the second lens element 30 of the present embodiment are the same as the configurations of the second lens element 30 of Embodiment 1. Note that the conditions of equation (1) are satisfied when the conditions of equation (4) are satisfied.

$$\frac{N2 \times P \times Lp1}{2 \times Lp1 - N1 \times P} > Lp2 > (N2-1) \times P \qquad (4)$$

Figure 17:
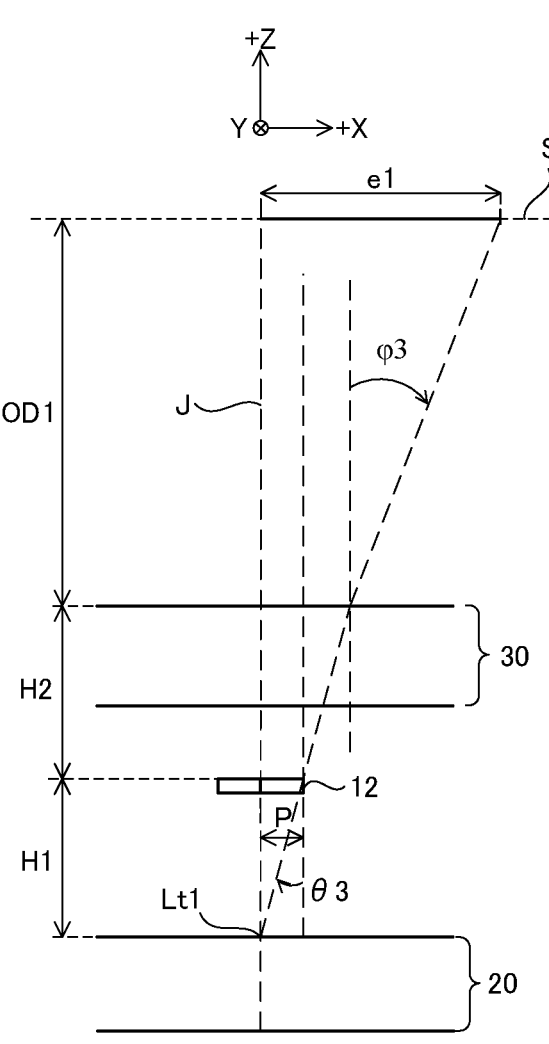
FIG. 17 is a schematic view illustrating an optical model of a three-dimensional image display at N1 viewpoints at the center of the display device, according to Embodiment 3.

Next, equation (4) is described. Firstly, the viewpoint pitch e1 is obtained. FIG. 17 illustrates an optical model (XZ cross-section) of the three-dimensional image display at the N1 viewpoints, at the center of the display device 100 of the present embodiment. In the three-dimensional image display at the N1 viewpoints, the pixels 12 having the pixel pitch P are projected by the first lens element 20 at the viewpoint pitch e1 on the observation plane S positioned at the optimal viewing distance OD1. As such, the following equations (4-1), (4-2), and (4-3) are established. Here, n represents the refractive index of the display device 100.

$$\sin\varphi3 = n \times \sin\theta3 \qquad (4-1)$$

$$\tan\varphi3 = \frac{e1 - P - H2 \times \tan\theta3}{OD1} \qquad (4-2)$$

$$\tan\theta3 = \frac{P}{H1} \qquad (4-3)$$

When θ3 and φ3 are sufficiently small, approximation as sin θ3=tan θ3 and sin φ3=tan φ3 is possible, and the following equation (4-4) can be obtained from the equations (4-1) to (4-3).

$$e1 = \frac{n \times P \times \times OD1 + P \times H1 + P \times H2}{H1} \qquad (4-4)$$

Figure 18:
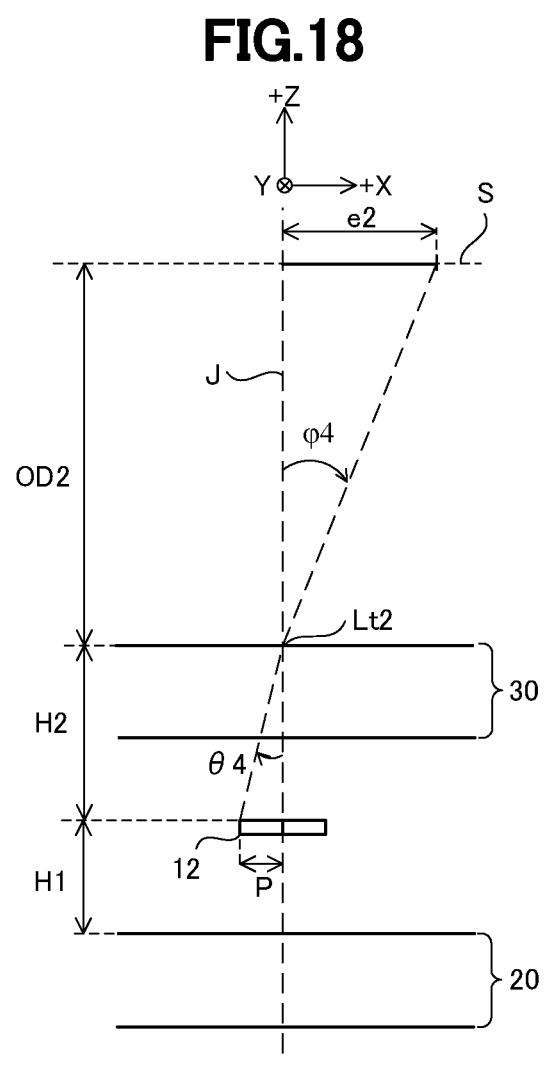

Next, the viewpoint pitch e2 is obtained. FIG. 18 illustrates an optical model (XZ cross-section) of the three-dimensional image display at the N2 viewpoints, at the center of the display device 100 of the present embodiment. The pixels 12 having the pixel pitch P are projected through the second lens element 30 at the viewpoint pitch e2 on the observation plane S positioned at the optimal viewing distance OD2. As such, the following equations (4-5), (4-6), and (4-7) are established.

$$\sin\varphi4 = n \times \sin\theta4 \tag{4-5}$$

$$\tan\varphi4 = \frac{e2}{OD2} \tag{4-6}$$

$$\tan\theta4 = \frac{P}{H2} \tag{4-7}$$

When $\theta4$ and $\varphi4$ are sufficiently small, approximation as $\sin\theta4 = \tan\theta4$ and $\sin\varphi4 = \tan\varphi4$ is possible, and the following equation (4-8) can be obtained from the equations (4-5) to (4-7).

$$e2 = \frac{n \times P \times OD2}{H2} \tag{4-8}$$

Figures 19, 20:
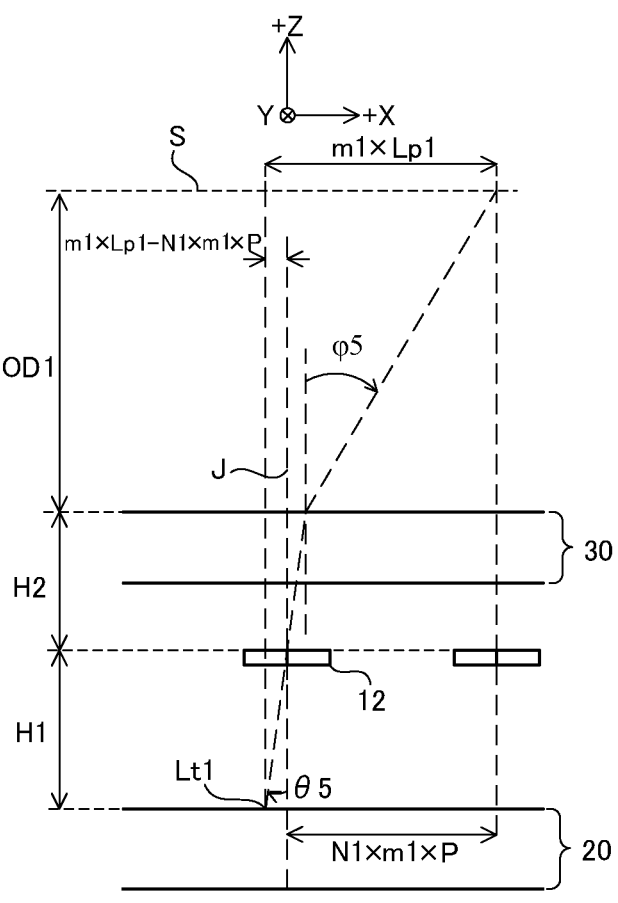
FIG. 19 is a schematic view illustrating an optical model of the three-dimensional image display at N1 viewpoints at a –X direction end of the display device, according to Embodiment 3.
FIG. 20 is a drawing illustrating values of the lens pitch, values of the viewpoint pitch, and values of the optimal viewing distance of example 5 according to Embodiment 3.

Next, the optimal viewing distance OD1 is obtained. FIG. 19 illustrates an optical model (XZ cross-section) of the three-dimensional image display at the N1 viewpoints, at the −X direction end of the display device 100 of the present embodiment. In the three-dimensional image display at the N1 viewpoints, the lens pitch Lp1 of the first lens element 20 is set slightly larger than the pitch P×N1 of the first pixel unit 14. As such, the following equations (4-9), (4-10), and (4-11) are established.

$$\sin\varphi5 = n \times \sin\theta5 \tag{4-9}$$

$$\tan\varphi5 = \frac{N1 \times m1 \times P - H2 \times \tan\theta5}{OD1} \tag{4-10}$$

$$\tan\theta5 = \frac{m1 \times Lp1 - N1 \times m1 \times P}{H1} \tag{4-11}$$

When $\theta5$ and $\varphi5$ are sufficiently small, approximation as $\sin\theta5 = \tan\theta5$ and $\sin\varphi5 = \tan\varphi5$ is possible, and the following equation (4-12) can be obtained from the equations (4-9) to (4-11).

$$OD1 = \frac{N1 \times P \times H1}{n \times (Lp1 - N1 \times P)} - \frac{H2}{n} \tag{4-12}$$

Next, the optimal viewing distance OD2 is obtained. According to the same optical model as the optical model illustrated in FIG. 13 of Embodiment 2, the optimal viewing distance OD2 is expressed by the following equation (4-13).

$$OD2 = \frac{Lp2 \times H2}{n \times (N2 \times P - Lp2)} \tag{4-13}$$

When the viewpoint pitch e2 is narrower than the viewpoint pitch e1, the following equation (4-14) is established from equations (4-4) and (4-8). The following equation (4-15) can be obtained from the equations (4-12) to (4-14).

$$\frac{n \times P \times OD1 + P \times H1 + P \times H2}{H1} > \frac{n \times P \times OD2}{H2} \tag{4-14}$$

-continued $$\frac{N2 \times P \times Lp1}{2 \times Lp1 - N1 \times P} > Lp2 \tag{4-15}$$

Furthermore, the second lens element 30 divides the light emitted from the N2 pixels 12 and, as such, the lens pitch Lp2 satisfies the following equation (4-16). Equation (4) can be obtained from equations (4-15) and (4-16).

$$Lp2 > (N2-1) \times P \tag{4-16}$$

For example, when the image display 10 is a 6.9 inch-diagonal wide quad high definition (WQHD) display having a pixel pitch P of 60 μm, as illustrated in example 5 of FIG. 20, the conditions of equation (4) are satisfied and, as a result, the viewpoint pitch e2 can be made narrower than the viewpoint pitch e1 (conditions of the first lens element 20: N1=2, H1=0.5 mm, Lp1=119.9 μm, OD1=399 mm, and e1=72.1 mm). Additionally, it is possible to reduce the difference between the optimal viewing distance OD1 and the optimal viewing distance OD2.

As described above, in the present embodiment, as a result of satisfying the conditions of equation (4), the viewpoint pitch e2 in the three-dimensional image display at the N2 viewpoints can be made narrower than the viewpoint pitch e1 in the three-dimensional image display at the N1 viewpoints. Additionally, it is possible to reduce the difference between the optimal viewing distance OD1 and the optimal viewing distance OD2. In the present embodiment, when viewed from the observer, the second lens element 30, the image display 10, and the first lens element 20 are sequentially stacked and, as such, the gap H1 between the apex Lt1 of the lens of the first lens element 20 and the pixels 12, and the gap H2 between the apex Lt2 of the lens of the second lens element 30 and the pixels 12 can be set, regardless of the thickness of the other lens element. Additionally, the stacking accuracy of the first lens element 20 and the second lens element 30 on the image display 10 can be enhanced.

Embodiment 4

In Embodiment 3, the first lens element 20 is disposed on the side opposite the display surface 10a side of the image display 10. However, a configuration is possible in which the first lens element 20 is disposed on the side of the display surface 10a side of the image display 10, and the second lens element 30 is disposed on the side opposite the display surface 10a side of the image display 10.

As illustrated in FIG. 21, the display device 100 of the present embodiment includes the image display 10, the first lens element 20, the second lens element 30, and the light source 310. In the present embodiment, the first lens element 20 is disposed on the side of the display surface 10a side of the image display 10. The second lens element 30 is disposed on the side opposite the display surface 10a side of the image display 10. The configurations of the image display 10 and the light source 310 of the present embodiment are the same as those of the image display 10 and the light source 310 of Embodiment 3. Additionally, the first lens element 20 of the present embodiment is the same as the first lens element 20 of Embodiment 1. As such, here, the second lens element 30 of the present embodiment is described.

The second lens element 30 of the present embodiment is stacked on the image display 10 and is disposed between the image display 10 and the light source 310. When the parallax images corresponding to each of the N2 viewpoints are displayed on the image display 10, the second lens element 30 of the present embodiment divides the light emitted from the light source 310 to divide the light, emitted from the pixels 12 included in the second pixel unit 16 displaying the parallax images, among each of the N2 viewpoints corresponding to the parallax images. As a result, the display device 100 of the present embodiment can display the three-dimensional image display at the N2 viewpoints.

In the present embodiment, as a result of satisfying the conditions of equation (5), the viewpoint pitch e2 in the three-dimensional image display at the N2 (where N2>N1) viewpoints can be made narrower than the viewpoint pitch e1 in the three-dimensional image display at the N1 (integer of 2 or greater) viewpoints. The other configurations of the second lens element 30 of the present embodiment are the same as the configurations of the second lens element 30 of Embodiment 1.

$$(N2+1) \times P > Lp2 > \frac{N2 \times P \times Lp1}{2 \times Lp1 - N1 \times P} \qquad (5)$$

Next, equation (5) is described. According to the same optical model as the optical model illustrated in FIG. 18 of Embodiment 3, the viewpoint pitch e1 is expressed by the following equation (5-1).

$$e1 = \frac{n \times P \times OD1}{H1} \qquad (5\text{-}1)$$

Additionally, according to the same optical model as the optical model illustrated in FIG. 17 of Embodiment 3, the viewpoint pitch e2 is expressed by the following equation (5-2).

$$e2 = \frac{n \times P \times OD2 + P \times H2 + P \times H1}{H2} \qquad (5\text{-}2)$$

Furthermore, according to the same optical model as the optical model illustrated in FIG. 13 of Embodiment 2, the optimal viewing distance OD1 is expressed by the following equation (5-3). According to the same optical model as the optical model illustrated in FIG. 19 of Embodiment 3, the optimal viewing distance OD2 is expressed by the following equation (5-4).

$$OD1 = \frac{Lp1 \times H1}{n \times (N1 \times P - Lp1)} \qquad (5\text{-}3)$$

$$OD2 = \frac{N2 \times P \times H2}{n \times (Lp2 - N2 \times P)} - \frac{H1}{n} \qquad (5\text{-}4)$$

When the viewpoint pitch e2 is narrower than the viewpoint pitch e1, the following equation (5-5) is established from equations (5-1) and (5-2). The following equation (5-6) can be obtained from the equations (5-3) to (5-5).

$$\frac{n \times P \times OD1}{H1} > \frac{n \times P \times OD2 + P \times H2 + P \times H1}{H2} \qquad (5\text{-}5)$$

$$Lp2 > \frac{N2 \times P \times Lp1}{2 \times Lp1 - N1 \times P} \qquad (5\text{-}6)$$

Furthermore, the second lens element 30 distributes the light emitted from the N2 pixels 12 and, as such, the lens pitch Lp2 satisfies the following equation (5-7). Equation (5) can be obtained from equations (5-6) and (5-7).

$$(N2+1) \times P > Lp2 \qquad (5\text{-}7)$$

For example, when the image display 10 is a 6.9 inch-diagonal wide quad high definition (WQHD) display having a pixel pitch P of 60 μm, as illustrated in example 6 of FIG. 22, the conditions of equation (5) are satisfied and, as a result, the viewpoint pitch e2 can be made narrower than the viewpoint pitch e1 (conditions of the first lens element 20: N1=2, H1=0.5 mm, Lp1=119.9 μm, OD1=400 mm, and e1=71.9 mm). Additionally, it is possible to reduce the difference between the optimal viewing distance OD1 and the optimal viewing distance OD2.

As described above, in the present embodiment, as a result of satisfying the conditions of equation (5), the viewpoint pitch e2 in the three-dimensional image display at the N2 viewpoints can be made narrower than the viewpoint pitch e1 in the three-dimensional image display at the N1 viewpoints. Additionally, it is possible to reduce the difference between the optimal viewing distance OD1 and the optimal viewing distance OD2. In the present embodiment, when viewed from the observer, the first lens element 20, the image display 10, and the second lens element 30 are sequentially stacked and, as such, the gap H1 between the apex Lt1 of the lens of the first lens element 20 and the pixels 12, and the gap H2 between the apex Lt2 of the lens of the second lens element 30 and the pixels 12 can be set, regardless of the thickness of the other lens element. Additionally, the stacking accuracy of the first lens element 20 and the second lens element 30 on the image display 10 can be enhanced. Furthermore, the first lens element 20, which functions as a lenticular lens in the three-dimensional image display in which the number of viewpoints (N1) is few, is positioned on the observer side. Accordingly, a three-dimensional image for which the number of viewpoints is few and that has high definition can be displayed without the emitted light from the first lens element 20 being disturbed by the other members.

Regarding Equation (1)

Equation (1) of Embodiment 1 can be obtained from an optical model that is the same as the optical model of the three-dimensional image display of Embodiment 2.

Specifically, the following equation (1-1) can be obtained from equation (2-4), and the following equation (1-2) can be obtained from equation (2-5).

$$e1 = \frac{(n \times OD1 + H2 - H1) \times P}{H1} \qquad (1\text{-}1)$$

$$e2 = \frac{n \times P \times OD2}{H2} \qquad (1\text{-}2)$$

In order to make the viewpoint pitch e2 in the three-dimensional image display at the N2 (where N2>N1) viewpoints narrower than the viewpoint pitch e1 in the three-dimensional image display at the N1 (integer of 2 or greater) viewpoints (e1>e2), the following equation (1-3) must be satisfied on the basis of equations (1-1) and (1-2).

$$\frac{n \times OD1 + H2 - H1}{H1} > \frac{n \times OD2}{H2} \qquad (1\text{-}3)$$

Meanwhile, the following equation (1-4) can be obtained from equation (3-4), and the following equation (1-5) can be obtained from equation (3-5).

$$\frac{n \times OD1 + H2 - H1}{H1} = \frac{m1 \times Lp1}{N1 \times m1 \times P - m1 \times Lp1} \quad (1\text{-}4)$$

$$\frac{n \times OD2}{H2} = \frac{m2 \times Lp2}{N2 \times m2 \times P - m2 \times Lp2} \quad (1\text{-}5)$$

The following equation (1-6) can be obtained from equations (1-3) to (1-5).

$$Lp1 \times \frac{N2}{N1} > Lp2 \quad (1\text{-}6)$$

Furthermore, as in Embodiment 3, the lens pitch Lp2 of the second lens element 30 satisfies equation (4-16). Accordingly, equation (1) can be obtained from equations (1-6) and (4-16).

Modified Examples

Embodiments have been described, but various modifications can be made to the present disclosure without departing from the spirit and scope of the present disclosure.

For example, the image display 10 is not limited to an organic EL display panel. The image display 10 of Embodiment 1 and Embodiment 2 may be implemented as a transmissive liquid crystal display panel.

The arrangement of the pixels 12 of the image display 10 is not limited to a horizontal stripe arrangement. The arrangement of the pixel 12 may be a vertical stripe arrangement, a delta arrangement, or the like. Additionally, the pixels 12 are not limited to the three colors of red, green, and blue, and may be four colors.

The first lens element (liquid crystal lens) 20 may include an insulating layer, a dielectric layer, or the like on the first electrode 24 and the second electrodes 25 and 26. Additionally, the second lens element (liquid crystal lens) 30 may include an insulating layer, a dielectric layer, or the like on the third electrode 34 and the fourth electrodes 35 and 36. Furthermore, the first lens element (liquid crystal lens) 20 and the second lens element (liquid crystal lens) 30 may be different types of liquid crystal gradient index (GRIN) lenses.

In Embodiment 1 and Embodiment 2, the first lens element 20 and the second lens element 30 are sequentially stacked, in the order of the first lens element 20 and the second lens element 30, on the display surface 10a of the image display 10. However, the first lens element 20 and the second lens element 30 may be stacked, in the order of the second lens element 30 and the first lens element 20, on the display surface 10a of the image display 10.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device, comprising:
an image display that includes a plurality of pixels, and that displays parallax images corresponding to each of N1 viewpoints along a predetermined direction and parallax images corresponding to each of N2 viewpoints along the predetermined direction, N1 being an integer of 2 or greater and N2 being an integer greater than N1;
a first lens element that is stacked on the image display and that, when the parallax images corresponding to each of the N1 viewpoints are displayed on the image display, divides light, emitted from the plurality of pixels displaying each of the parallax images, among each of the N1 viewpoints corresponding to each of the parallax images; and
a second lens element that is stacked on the image display and that, when the parallax images corresponding to each of the N2 viewpoints are displayed on the image display, divides the light, emitted from the plurality of pixels displaying each of the parallax images, among each of the N2 viewpoints corresponding to each of the parallax images, wherein
the second lens element is disposed on a display surface side of the image display, and
when a lens pitch of the first lens element is Lp1, a lens pitch of the second lens element is Lp2, and a pixel pitch in the predetermined direction of the plurality of pixels is P, $$Lp1 \times \frac{N2}{N1} > Lp2 > (N2 - 1) \times P \quad (1)$$

is satisfied.

2. The display device according to claim 1, wherein
the first lens element is disposed on the display surface side of the image display, and
when a gap between an apex of a lens of the first lens element and the pixels is H1, a viewpoint pitch of the N1 viewpoints is e1, a gap between an apex of a lens of the second lens element and the pixels is H2, and a viewpoint pitch of the N2 viewpoints is e2, $$H2 = \frac{H1 \times (e1 + P)}{e2 + P} \quad (2)$$

$$Lp2 = N2 \times \frac{N1 \times P \times (e2 - e1) + Lp1 \times (e1 + P)}{N1 \times (e2 + P)} \quad (3)$$

are satisfied.

3. The display device according to claim 1, wherein
the first lens element is disposed on a side opposite the display surface side of the image display, and $$\frac{N2 \times P \times Lp1}{2 \times Lp1 - N1 \times P} > Lp2 > (N2 - 1) \times P \quad (4)$$

is satisfied.

4. A display device, comprising:
an image display that includes a plurality of pixels, and that displays parallax images corresponding to each of N1 viewpoints along a predetermined direction and parallax images corresponding to each of N2 viewpoints along the predetermined direction, N1 being an integer of 2 or greater and N2 being an integer greater than N1;

a first lens element that is stacked on the image display and that, when the parallax images corresponding to each of the N1 viewpoints are displayed on the image display, divides light, emitted from the plurality of pixels displaying each of the parallax images, among each of the N1 viewpoints corresponding to each of the parallax images; and a second lens element that is stacked on the image display and that, when the parallax images corresponding to each of the N2 viewpoints are displayed on the image display, divides the light, emitted from the plurality of pixels displaying each of the parallax images, among each of the N2 viewpoints corresponding to each of the parallax images, wherein the first lens element is disposed on a display surface side of the image display, the second lens element is disposed on a side opposite the display surface side of the image display, and when a lens pitch of the first lens element is Lp1, a lens pitch of the second lens element is Lp2, and a pixel pitch in the predetermined direction of the pixels is P, $$(N2+1) \times P > Lp2 > \frac{N2 \times P \times Lp1}{2 \times Lp1 - N1 \times P} \tag{5}$$

is satisfied.

\* \* \* \* \*